United States Patent
Shin et al.

(10) Patent No.: US 9,835,771 B2
(45) Date of Patent: Dec. 5, 2017

(54) POLARIZING PLATE AND LIQUID CRYSTAL DISPLAY INCLUDING THE SAME

(71) Applicant: SAMSUNG SDI CO., LTD., Yongin-si, Gyeonggi-do (KR)

(72) Inventors: Kwang Ho Shin, Uiwang-si (KR); Eun Su Park, Uiwang-si (KR); Dong Yoon Shin, Uiwang-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 50 days.

(21) Appl. No.: 14/952,795

(22) Filed: Nov. 25, 2015

(65) Prior Publication Data
US 2016/0146980 A1 May 26, 2016

(30) Foreign Application Priority Data
Nov. 26, 2014 (KR) .................. 10-2014-0166805

(51) Int. Cl.
*G02B 1/18* (2015.01)
*G02B 5/30* (2006.01)
(Continued)

(52) U.S. Cl.
CPC ............. *G02B 1/18* (2015.01); *G02B 5/3083* (2013.01); *G02F 1/13363* (2013.01); *G02F 1/133528* (2013.01)

(58) Field of Classification Search
CPC ........... G02F 1/13363; G02F 1/133528; G02F 1/1335; G02B 5/3083; G02B 1/18
(Continued)

(56) References Cited

U.S. PATENT DOCUMENTS

| 8,760,601 B2 * | 6/2014 | Izaki | G02B 1/14 349/62 |
| 2007/0285777 A1 * | 12/2007 | Toyoshima | G02B 1/105 359/487.05 |

(Continued)

FOREIGN PATENT DOCUMENTS

| JP | 2010-107892 A | 5/2010 |
| JP | 2010-181500 A | 8/2010 |

(Continued)

OTHER PUBLICATIONS

Taiwan Office Action from corresponding Taiwan application No. 104139302 dated Nov. 3, 2016 (3 pgs.).

(Continued)

*Primary Examiner* — Frank Font
(74) *Attorney, Agent, or Firm* — Lewis Roca Rothgerber Christie LLP

(57) ABSTRACT

A polarizing plate and a liquid crystal display including the polarizing plate include: a polarizer; and a surface protective film on a first surface of the polarizer, and the surface protective film includes a first protective film on the first surface of the polarizer, and a primer layer on at least one surface of the first protective film, a refractive index ratio of the first protective film to the primer layer satisfying the equation: $0.6 < R_1/R_2 < 1.0$, where $R_1$ is an index of refraction of the primer layer, and $R_2$ is an index of refraction of the first protective film, and the first protective film has an in-plane retardation (Re) of about 500 nm or less and an out-of-plane retardation (Rth) of about 10,000 nm or less at a wavelength of 550 nm.

16 Claims, 4 Drawing Sheets

(51) Int. Cl.
*G02F 1/1335* (2006.01)
*G02F 1/13363* (2006.01)

(58) Field of Classification Search
USPC .............. 359/489.07, 507, 513; 349/117, 118
See application file for complete search history.

(56) References Cited

U.S. PATENT DOCUMENTS

| | | |
|---|---|---|
| 2009/0290104 A1 | 11/2009 | Nakagawa et al. |
| 2011/0194048 A1* | 8/2011 | Izaki ..................... G02B 1/14 349/62 |
| 2013/0194211 A1 | 8/2013 | Shinohara et al. |
| 2013/0279155 A1 | 10/2013 | Kuroda et al. |
| 2014/0293197 A1* | 10/2014 | Shin ..................... G02B 5/3083 349/96 |
| 2015/0362798 A1* | 12/2015 | Kwon .................. G02F 1/1335 428/1.5 |
| 2016/0266293 A1* | 9/2016 | Hong .................. G02B 5/3025 |

FOREIGN PATENT DOCUMENTS

| | | |
|---|---|---|
| JP | 2014-182321 A | 9/2014 |
| KR | 10-2011-0024442 A | 3/2011 |
| KR | 10-2013-0040725 A | 4/2013 |
| KR | 10-1337005 B | 12/2013 |
| TW | 200535465 A | 11/2005 |

OTHER PUBLICATIONS

Korean Office action for corresponding Korean Application No. 10-2014-0166805, filed Nov. 26, 2014, Korean Office action dated Jan. 16, 2017 (6 pgs.).

* cited by examiner

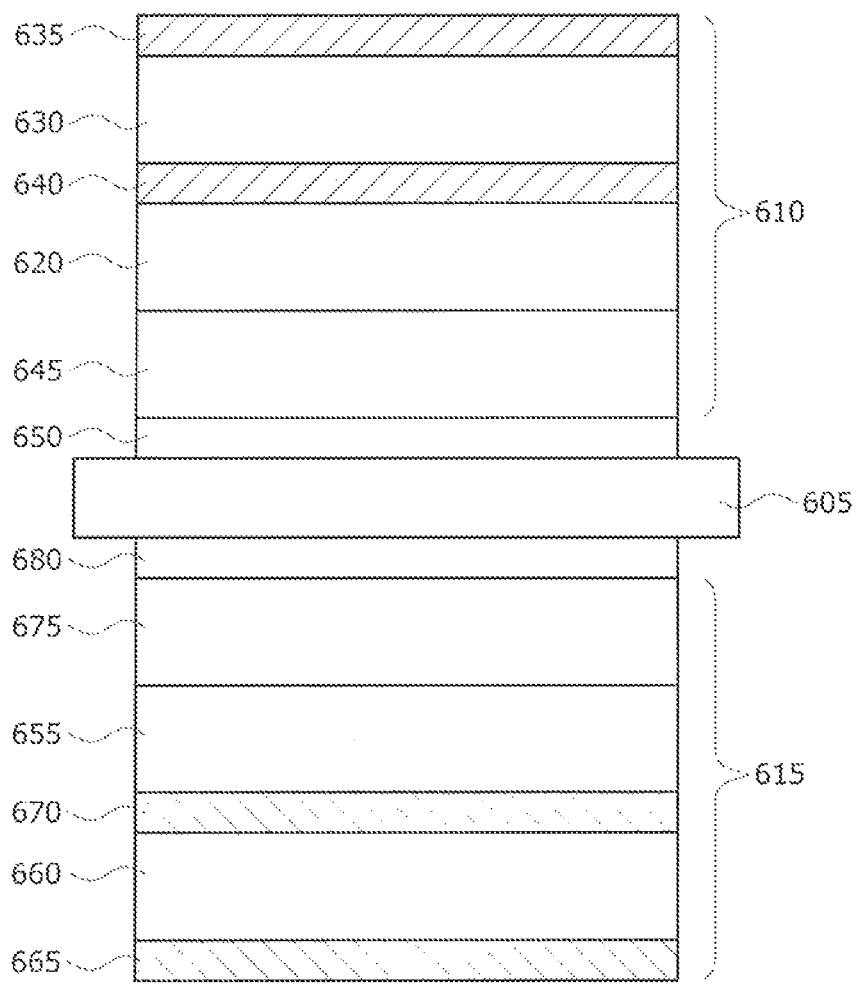

POLARIZING PLATE AND LIQUID CRYSTAL DISPLAY INCLUDING THE SAME

CROSS-REFERENCE TO RELATED APPLICATION

This application claims priority to and the benefit of Korean Patent Application No. 10-2014-0166805, filed on Nov. 26, 2014 in the Korean Intellectual Property Office, the entire content of which is incorporated herein by reference.

BACKGROUND

1. Field

Aspects of embodiments of the present invention relate to a polarizing plate and a liquid crystal display including the same.

2. Description of the Related Art

Polarizing plates are disposed inside and outside a liquid crystal cell for the purpose of controlling an oscillation direction of light to visualize display patterns of a liquid crystal display. Although the liquid crystal display was applied to small apparatuses in the initial stages of development, recently, the liquid crystal display is used in a wide range of applications including notebook computers, liquid crystal monitors, liquid crystal color projectors, liquid crystal televisions, navigation systems for vehicles, personal phones, indoor and outdoor measurement instruments, and the like.

A polarizing plate used in a liquid crystal display includes a polarizer and protective films formed on one or both sides of the polarizer. The primary function of the protective films is to protect the polarizer. A protective film stacked on one side of the polarizer is stretched to have a viewing angle compensation function through suitable phase retardation, whereas a protective film stacked on the other side of the polarizer is formed of a triacetylcellulose (TAC) film, considering that phase retardation does not influence optical characteristics. However, the TAC film is typically produced through volatilization of a solvent by a casting process and is thus more expensive than general polymer films in the art.

Accordingly, inexpensive polymer films including a polyethylene terephthalate (PET) film have been developed in order to replace the TAC film. However, such an inexpensive polymer film is fabricated through high magnification stretching in order to improve yield and thus has high retardation. A liquid crystal display fabricated by stacking such an ultrahigh-retardation film is likely to suffer from rainbow spots causing deterioration in image quality.

In addition, the TAC film has a polar group and thus does not require a bi-adhesive primer. However, a polymer film such as a PET film has a non-polar surface and thus requires the bi-adhesive primer and exhibits lower transmittance than the TAC film. Moreover, when bonded to a polarizer, the PET film has a problem of compromise between bonding performance and transmittance. That is, good bonding performance of the PET film to the polarizer can lead to deterioration in transmittance, or vice versa. In order to solve this problem, an Index of refraction and thickness of the bi-adhesive primer with respect to a base film become important.

In the related art, Korean Patent Publication No. 10-2011-0024442 A discloses a polymer base including a highly functional primer layer exhibiting good bonding performance and an optical member using the same.

SUMMARY

According to an aspect of embodiments of the present invention, a polarizing plate can maintain bonding performance between a polarizer and a protective film, has a transmittance of about 90% or greater and good price competitiveness, and can suppress generation of rainbow spots while securing good image quality. According to another aspect of embodiments of the present invention, a liquid crystal display uses the above-described polarizer plate.

One aspect of the present invention relates to a polarizing plate. The polarizing plate includes: a polarizer; a surface protective film on a first surface of the polarizer, wherein the surface protective film comprises a first protective film on the first surface of the polarizer, and a primer layer on at least one surface of the first protective film, wherein a refractive index ratio of the first protective film to the primer layer satisfies Equation 1:

$$0.6 < R_1/R_2 < 1.0, \quad \text{Equation 1}$$

(where $R_1$ is an index of refraction of the primer layer and $R_2$ is an index of refraction of the first protective film), and wherein the first protective film has an in-plane retardation (Re) of about 500 nm or less and an out-of-plane retardation (Rth) of about 10,000 nm or less at a wavelength of 550 nm, as respectively represented by Equations 2 and 3:

$$Re = (nx - ny) \times d, \quad \text{Equation 2}$$

$$Rth = ((nx + ny)/2 - nz) \times d, \quad \text{Equation 3}$$

(where nx, ny, and nz are indices of refraction at a wavelength of 550 nm in the x-, y- and z-axis directions, respectively, of the first protective film, and d is a thickness of the first protective film (unit: nm)).

The primer layer may have a thickness of about 5 nm to about 200 nm.

The primer layer may have an index of refraction of about 1.0 to about 1.6.

The primer layer may include silica particles.

The silica particles may have an average particle diameter of about 0.001 µm to about 10 µm.

The silica particles may be present in an amount of about 0.1% by weight (wt %) to about 20 wt % in the primer layer.

The first protective film may have a ratio of machine direction (MD) elongation to transverse direction (TD) elongation of about 1:0.8 to about 1:1.2.

The first protective film may have a ratio of MD elongation to TD elongation of about 1:1 and a degree of biaxiality (NZ) of about 1.0 or more at a wavelength of 550 nm, as represented by Equation 4:

$$NZ = (nx - nz)/(nx - ny), \quad \text{Equation 4}$$

(where nx, ny, and nz are indices of refraction at a wavelength of 550 nm in the x-, y- and z-axis directions, respectively, of the first protective film).

The first protective film may have nx-ny of about 0 to about 0.1, where nx is an index of refraction in the x-axis direction and ny is an index of refraction in the y-axis direction, and a degree of biaxiality (NZ) of about 5.0 or more, as represented by Equation 4:

$$NZ = (nx - nz)/(nx - ny), \quad \text{Equation 4}$$

(where nx, ny, and nz are indices of refraction at a wavelength of 550 nm in the x-, y- and z-axis directions, respectively, of the first protective film).

The polarizing plate may have a variation rate of transmittance of about 0.1 to about 1.8%, as represented by Equation 5:

$$\text{Variation rate of transmittance (\%)} = (T_B - T_A)/T_A \times 100, \quad \text{Equation 5}$$

(where $T_A$ is an initial transmittance of the polarizing plate, and $T_B$ is a transmittance of the polarizing plate after being maintained at 85° C. for 500 hours).

The surface protective film may have a transmittance of about 92% or greater.

The first protective film may be a non-birefringent film.

The first protective film may include at least one resin selected from the group consisting of polyester resins, (meth)acrylic resins, and cyclic polyolefin (COP) resins.

The polarizing plate may further include a second protective film on a second surface of the polarizer opposite the first surface.

The second protective film may include at least one resin selected from the group consisting of cellulose resins, polyester resins, cyclic polyolefin resins, polycarbonate resins, polyethersulfone resins, polysulfone resins, polyamide resins, polyimide resins, polyolefin resins, polyarylate resins, polyvinyl alcohol resins, polyvinyl chloride resins, and polyvinylidene chloride resins.

Another aspect of the present invention relates to a liquid crystal display including a polarizing plate as described above.

BRIEF DESCRIPTION OF THE DRAWINGS

FIG. 6 is a sectional view of a liquid crystal display according to an embodiment of the present invention.

DETAILED DESCRIPTION

Figure 1:
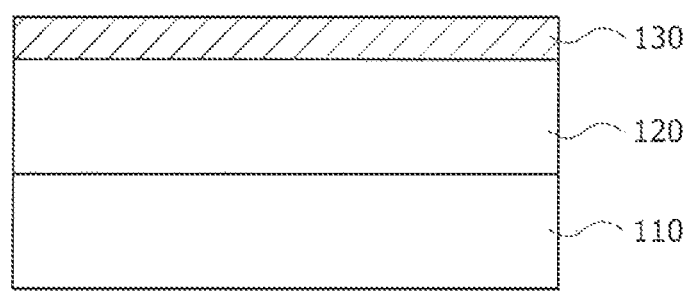
FIG. 1 is a sectional view of a polarizing plate according to an embodiment of the present invention.

Some exemplary embodiments of the present invention will be described in further detail with reference to the accompanying drawings. It should be understood that the present invention may be embodied in different ways and is not limited to the following embodiments. In the drawings, portions not relevant to the description may be omitted for clarity. Like components will be denoted by like reference numerals throughout the specification.

As used herein, spatially relative terms such as "upper" and "lower" are defined with reference to the accompanying drawings. Thus, it will be understood that the term "upper side (surface)" can be used interchangeably with the term "lower side (surface)."

According to one or more embodiments of the present invention, a polarizing plate includes a polarizer; a first protective film formed on a surface of the polarizer; and a primer layer formed on at least one surface of the first protective film. The primer layer may be formed on an upper or lower surface of the first protective film or on both surfaces thereof.

FIG. 1 is a sectional view of a polarizing plate according to an embodiment of the present invention.

Referring to FIG. 1, a polarizing plate 100 according to an embodiment of the present invention includes a polarizer 110, a first protective film 120 formed on an upper surface of the polarizer 110, and a primer layer 130 formed on an upper surface of the first protective film 120.

The first protective film 120 may be a hydrophobic film. In some embodiments, the first protective film may be formed of polyester resins, (meth)acrylic resins, or cyclic polyolefin (COP) resins, without being limited thereto. These resins may be used alone or in combination thereof.

The first protective film may have a thickness of about 10 μm to about 500 μm and, in one embodiment, about 10 μm to about 100 μm. Within this range, the first protective film can be used as a protective film for polarizing plates when stacked on the polarizer.

The first protective film may have an index of refraction of about 1.3 to about 1.7 and, in one embodiment, about 1.4 to about 1.6. Within this range, the first protective film can be used as a protective film for polarizing plates and allows easy control of the index of refraction with respect to the primer layer, thereby improving transmittance. The index of refraction may be a value measured at 550 nm using an Abbe refractometer.

The first protective film may be a biaxially stretched film obtained by stretching the film in the machine direction (MD) and in the transverse direction (TD) at the same time. Alternatively, the first protective film may be fabricated by stretching in the MD, followed by stretching in the TD, or vice versa. In some embodiments, the first protective film is stretched substantially to the same elongation in the MD and in the TD while being stretched simultaneously both in the MD and in the TD, thereby preventing or substantially preventing generation of rainbow spots on front and side surfaces of the polarizing plate. In some embodiments, the first protective film may have a ratio of MD elongation to TD elongation of about 1:0.8 to about 1:1.2 and, in one embodiment, about 1:1. If the ratio of MD elongation to TD elongation of the first protective film is less than about 0.8 or greater than about 1.2, the first protective film has high in-plane retardation (Re), thereby causing generation of rainbow spots. In some embodiments, the first protective film may have a ratio of MD elongation to TD elongation of about 1:0.85 to about 1:1.15, about 1:0.9 to about 1:1.1, about 1:0.95 to about 1:1.05, about 1:0.96 to about 1:1.04, about 1:0.97 to about 1:1.03, about 1:0.98 to about 1:1.02, about 1:0.99 to about 1:1.01, about 1:1, about 1:0.85 to about 1:1.09, about 1:0.85 to about 1:1.08, or about 1:0.85 to about 1:1.07. In one embodiment, the first protective film may have an MD elongation of about 1.0 to about 4.0 and, in one embodiment, about 2.5 to about 3.5, and a TD elongation of about 1.0 to about 4.0 and, in one embodiment, about 2.5 to about 3.5. Within this range, the first protective film has substantially the same MD elongation as the TD elongation thereof, thereby suppressing generation of rainbow spots on the front and side surfaces of the polarizing plate when used in the polarizing plate.

In one embodiment, the first protective film may have an in-plane retardation (Re) of about 500 nm or less and an out-of-plane retardation (Rth) of about 10,000 nm or less at a wavelength of 550 nm, as respectively represented by Equations 2 and 3:

$$Re = (nx - ny) \times d, \quad \text{Equation 2}$$

$$Rth = ((nx + ny)/2 - nz) \times d, \quad \text{Equation 3}$$

(where nx, ny, and nz are indices of refraction at a wavelength of 550 nm in the x-, y- and z-axis directions, respectively, of the first protective film, and d is a thickness of the first protective film (unit: nm)).

Within these ranges of Re and Rth, the first protective film can suppress generation of rainbow spots on the front and side surfaces of the polarizing plate when used in the polarizing plate, and can secure good optical quality of a liquid crystal display panel. In one embodiment, the first protective film has an in-plane retardation (Re) of about 0 to about 500 nm, more preferably about 0 to about 400 nm, and still more preferably about 0 to about 100 nm. It is advantageous for the in-plane retardation (Re) of the first protective film to approach 0 nm. In one embodiment, the first protective film has an out-of-plane retardation (Rth) of about 0 to about 10,000 nm, more preferably about 0 to about 4,000 nm, and still more preferably about 100 to about 3,000 nm.

The first protective film may have a degree of biaxiality (NZ) of about 1.0 or more at a wavelength of 550 nm, preferably about 2.0 to ∞ (for example, about 2 to about $10^{10000}$), more preferably, about 5.0 to ∞ (for example, about 5.0 to about $10^{10000}$), for example, an infinite value, as represented by Equation 4:

$$NZ=(nx-nz)/(nx-ny),\qquad \text{Equation 4}$$

(where nx, ny, and nz are indices of refraction at a wavelength of 550 nm in the x-, y- and z-axis directions, respectively, of the first protective film).

For the first protective film, the x-axis direction, the y-axis direction, and the z-axis direction are the MD, the TD, and the thickness direction, respectively.

For the first protective film, the index of refraction at a wavelength of 550 nm in the x-axis direction is substantially the same as the index of refraction at a wavelength of 550 nm in the y-axis direction (nx≈ny), and nx−ny is about 0 to about 0.1, preferably about 0 to about 0.01, and it is more advantageous for nx−ny of the first protective film to approach 0 nm, such that the degree of biaxiality (NZ) of the first protective film can become ∞. Within this range, the first protective film can suppress generation of rainbow spots on the front and side surfaces of the polarizing plate when used as a protective film of the polarizing plate. Furthermore, the first protective film has small variation in retardation depending on incident angle and wavelength of light, and thus can prevent or substantially prevent generation of rainbow spots.

The polarizing plate may have a variation rate of transmittance of about 0.1% to about 1.8%, for example, about 0.3% to about 1.6% and, in one embodiment, 0.5% to about 1.2%, as represented by Equation 5:

$$\text{Variation rate of transmittance (\%)}=(T_B-T_A)/T_A\times 100,\qquad \text{Equation 5}$$

(where $T_A$ is an initial transmittance of the polarizing plate, and $T_B$ is a transmittance of the polarizing plate after being maintained at 85° C. for 500 hours).

Within this range, the polarizing plate can prevent or substantially prevent generation of rainbow spots.

The surface protective film may have a transmittance of about 92% or more, for example, about 93% and, in one embodiment, about 95%. Within this range of transmittance, the surface protective film can minimize or reduce variation of retardation, thereby preventing or substantially preventing generation of rainbow spots.

The first protective film may be a non-birefringent film, which does not provide birefringence. In this embodiment, the first protective film can remarkably prevent or substantially prevent generation of rainbow spots on the front and side surfaces of the polarizing plate. Furthermore, the first protective film has small variation in retardation depending on incident angle and wavelength of light, and thus can prevent or substantially prevent generation of rainbow spots.

The primer layer 130 is formed on the upper surface of the first protective film 120 to improve transmittance of the first protective film and the polarizing plate including the same.

As a result, the polarizing plate can improve the degree of polarization of the polarizer without an additional increase in transmittance of the polarizer. In addition, the primer layer maximizes or increases mechanical characteristics and moisture permeability of the first protective film, and secures high resistance of the polarizing plate with respect to severe external conditions.

A refractive index ratio of the first protective film to the primer layer satisfies Equation 1:

$$0.6<R_1/R_2<1.0,\qquad \text{Equation 1}$$

(where $R_1$ is an index of refraction of the primer layer and $R_2$ is an index of refraction of the first protective film).

In one embodiment, the refractive index ratio of the first protective film to the primer layer satisfies $0.65<R_1/R_2<1.0$, and more preferably $0.7<R_1/R_2<1.0$. Within this range, the primer layer can be used in the polarizing plate and has a suitable index of refraction as compared with the first protective film, thereby improving transmittance of the first protective film. The index of refraction may be measured at a wavelength of 550 nm using an Abbe refractometer.

It is desirable that the primer layer formed on the upper surface of the first protective film exhibit hydrophobicity in order to prevent or substantially prevent an increase in haze and a blocking phenomenon, which causes bonding by the primer upon rolling. In some embodiments, the primer layer may be a non-urethane primer layer free from a urethane group. For example, the primer layer may be formed of a composition including monomers or resins such as a polyester resin and an acrylic resin. Here, the mixing ratio (for example, a mole ratio) of the polyester resin to the acrylic resin may be adjusted to provide a desired index of refraction. In some embodiments, the polyester resin and the acrylic resin may be mixed in a ratio of 1:9 to 4:6, for example, 2:8 to 3:7. Within this range, the primer layer can increase adhesion, bonding performance, and transmittance.

The polarizing plate may further include a functional coating layer (not shown), for example, a hard coating layer, an anti-reflection layer, a low reflective layer or an anti-fingerprint layer, on an upper surface of the primer layer, to provide functionality. The functional coating layer may have a thickness of about 0.5 µm to about 20 µm. Within this range, the functional coating layer may be used in the polarizing plate when stacked on the polarizer.

In other embodiments, the primer layer may be formed between the first protective film and the polarizer. The primer layer formed between the first protective film and the polarizer can improve bonding performance with respect to the first protective film and the polarizer.

Figure 2:
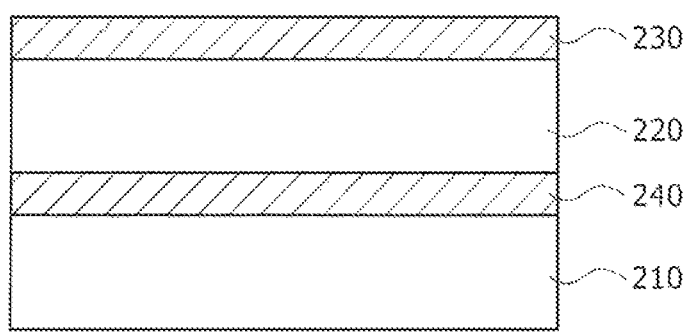
FIG. 2 is a sectional view of a polarizing plate according to another embodiment of the present invention.

FIG. 2 is a sectional view of a polarizing plate according to another embodiment of the present invention.

Referring to FIG. 2, a polarizing plate 200 according to another embodiment of the present invention includes a polarizer 210, a first protective film 220 formed on an upper surface of the polarizer 210, a first primer layer 230 formed on an upper surface of the first protective film 220, and a second primer layer 240 formed on a lower surface of the first protective film 220. The first protective film 220 may adjoin the first primer layer 230, and the first protective film 220 may adjoin the second primer layer 240.

The first primer layer 230 and the second primer layer 240 may have the same or different characteristics in terms of index of refraction, thickness, material, and the like.

When the first and second primer layers 230, 240 are respectively formed on both surfaces of the first protective film 220, it is desirable that the second primer layer 240 adjoining the polarizer exhibits both hydrophilicity and hydrophobicity. In addition, it is desirable that the first primer layer 230 adjoining the other side of the first protective film exhibit hydrophobicity in order to prevent or substantially prevent an increase in haze and a blocking phenomenon, which causes bonding by the primer upon rolling.

The first primer layer 230 may be the same as the primer layer 130 described above and, therefore, further description thereof will not be provided.

The composition of the second primer layer 240 may be the same composition as that of the primer layer 130, such as the described composition including one or more of polyester resins and acrylic resins, and may further include a PVA solution in order to provide hydrophilicity.

The primer layer may be formed of a primer composition. The primer composition may include various additives, such as a binder resin, silica particles, a UV absorbent, a curing agent, a surfactant, and/or an anti-foaming agent.

The binder resin may include monomers or resins such as polyester resins and acrylic resins. The binder resin may be present in an amount of about 0.5 wt % to about 50 wt % in the primer composition. Within this range, the binder resin can improve bonding performance of a base film under high temperature/humidity conditions such that the first protective film can be efficiently attached to the polarizer.

In some embodiments, the primer layer may be a non-urethane primer layer free from a urethane group. For example, the primer layer may be formed of a composition including monomers or resins such as a polyester resin and an acrylic resin. Here, the mixing ratio (for example, a mole ratio) of the polyester resin to the acrylic resin may be adjusted to provide a desired index of refraction.

The primer layer may include silica particles. The silica particles, in one embodiment, have an average particle diameter of about 0.001 µm to about 10 µm. Within this range, the silica particles can provide good slip properties in preparation of a film, thereby improving productivity while preventing or substantially preventing blocking between films. The silica particles may be present in an amount of about 0.1 wt % to about 20 wt % and, in one embodiment, about 0.5 wt % to about 20 wt %, in the primer composition. Within this range, the silica particles can provide good slip properties in preparation of a polyester film, thereby improving productivity.

The primer composition may further include additives. In some embodiments, the additives may include a crosslinking agent, a surfactant, an anti-foaming agent, an anti-static agent, and/or inorganic particles, without being limited thereto.

Such a primer layer has good properties in terms of primer adhesion, double-bonding performance to an adherent for polarizing plates, and transmittance.

In some embodiments, the first primer layer may have an index of refraction of about 1.0 to about 1.6, and the second primer layer may have an index of refraction of about 1.0 to about 1.6.

In one embodiment, the first primer layer and the second primer layer may have the same index of refraction.

In another embodiment, the first primer layer and the second primer layer may have different indices of refraction and different thicknesses, whereby the protective film for polarizing plates can be stacked on the polarizer and a functional layer can be additionally provided, thereby improving transmittance.

The first and/or second primer layer may have a thickness of about 5 nm to about 200 nm. Within this range, the first and second primer layers can be used in the polarizing plate, provide a suitable index of refraction for the first protective film to improve transmittance of the first protective film, and allow the polarizer to be sufficiently attached to the first protective film.

The polarizer has a specific direction of molecular alignment and allows transmission of light travelling in a specific direction therethrough when mounted on a liquid crystal display. The polarizer may be fabricated by dyeing a polyvinyl alcohol film with iodine or a dichroic dye, followed by stretching the polyvinyl alcohol film in a specific direction. Specifically, the polarizer may be fabricated through swelling, dyeing, stretching, and crosslinking. Methods of performing these processes are generally known to those skilled in the art.

The polarizer may have a thickness of about 5 µm to about 30 µm. Within this range, the polarizer can be used in a polarizing plate for liquid crystal displays.

Figure 3:
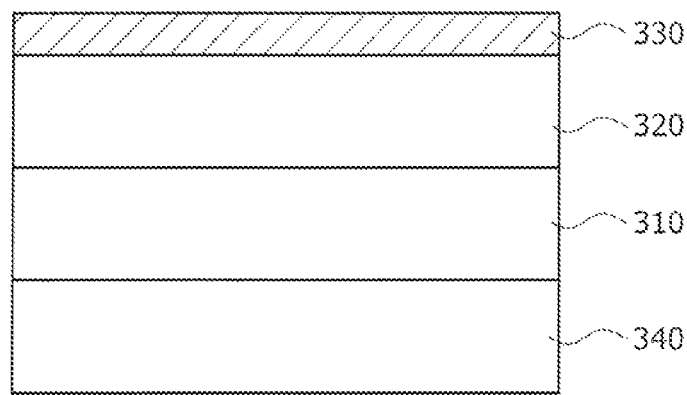
FIG. 3 is a sectional view of a polarizing plate according to another embodiment of the present invention
Figure 4:
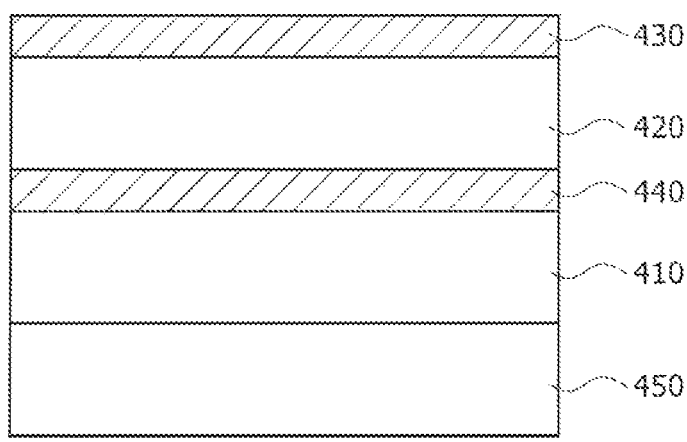
FIG. 4 is a sectional view of a polarizing plate according to yet another embodiment of the present invention

FIG. 3 and FIG. 4 are sectional views of polarizing plates according to other embodiments of the present invention.

Referring to FIG. 3, a polarizing plate 300 according to another embodiment includes a polarizer 310; a first protective film 320 formed on an upper surface of the polarizer 310; a primer layer 330 formed on an upper surface of the first protective film 320; and a second protective film 340 formed on a lower surface of the polarizer 310.

Referring to FIG. 4, a polarizing plate 400 according to yet another embodiment includes a polarizer 410; a first protective film 420 formed on an upper surface of the polarizer 410; a first primer layer 430 formed on an upper surface of the first protective film 420; a second primer layer 440 formed on a lower surface of the first protective film 420; and a second protective film 450 formed on a lower surface of the polarizer 410.

The second protective film 450 is a transparent optical film formed of polyester or non-polyester resins. The second protective film 450 may be formed of at least one of cellulose resins including triacetylcellulose, polyester resins including polyethylene terephthalate, polybutylene terephthalate, polyethylene naphthalate, polybutylene naphthalate and the like, cyclic polyolefin resins, polycarbonate resins, polyethersulfone resins, polysulfone resins, polyamide resins, polyimide resins, polyolefin resins, polyarylate resins, polyvinyl alcohol resins, polyvinyl chloride resins, and polyvinylidene chloride resins.

The second protective film 450 is, for example, a retardation compensation film, and may have a function of improving a viewing angle or adjusting phase retardation through adjustment of optical characteristics of light having passed through a liquid crystal display panel.

The second protective film 450 may have a thickness of about 10 µm to about 500 µm. Within this range, the second protective film 450 can be used in a polarizing plate for liquid crystal displays, can provide optical compensation effects when used in the polarizing plate, and can prevent or substantially prevent color variation and generation of spots while securing a good polarization state with respect to liquid crystals. In one embodiment, the second protective film 450 has a thickness of about 25 µm to about 80 µm.

Although not shown in FIG. 3 and FIG. 4, the polarizing plate may further include an adhesive layer (not shown) formed on a lower side of the second protective film. The polarizing plate can be stacked on the liquid crystal display panel via the adhesive layer. The adhesive layer may be formed of any adhesive for polarizing plates, for example, a (meth)acrylic adhesive.

Figure 5:
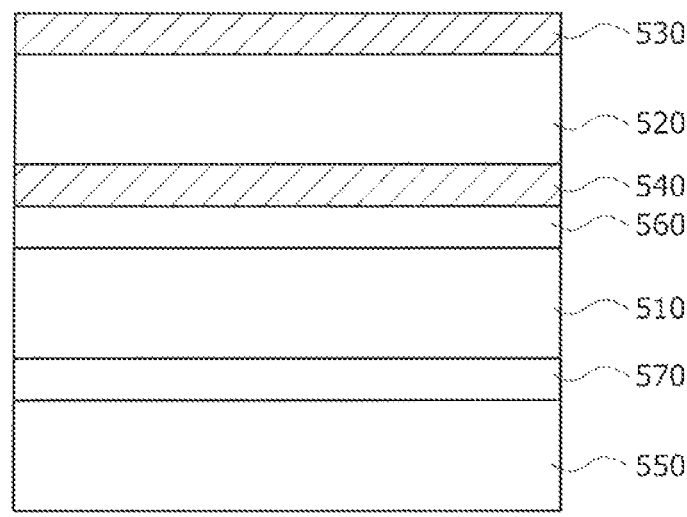
FIG. 5 is a sectional view of a polarizing plate according to yet another embodiment of the present invention.

FIG. 5 is a sectional view of a polarizing plate according to yet another embodiment of the present invention.

Referring to FIG. 5, a polarizing plate 500 according to another embodiment of the present invention includes a polarizer 510; a first protective film 520 formed on an upper surface of the polarizer 510; a first primer layer 530 formed on an upper surface of the first protective film 520; a second primer layer 540 formed on a lower surface of the first protective film 520; a second protective film 550 formed on a lower surface of the polarizer 510; a first bonding layer 560 formed between the second primer layer 540 and the polarizer 510; and a second bonding layer 570 formed between the polarizer 510 and the second protective film 550.

The second primer layer 540 can be bonded to the polarizer 510 via the first bonding layer 560, and the second protective film 550 can be stacked on a lower side of the polarizer 510 via the second bonding layer 570. The first bonding layer and the second bonding layer can improve mechanical strength of the polarizing plate, and may be formed of at least one bonding agent for polarizing plates, selected from among a water-based bonding agent, a UV curable bonding agent, and a pressure-sensitive bonding agent.

Although not shown in FIG. 5, the polarizing plate may further include a functional coating layer (not shown), for example, a hard coating layer, an anti-reflection layer, a low reflective layer or an anti-fingerprint layer, on an upper surface of the first primer layer 530, to provide functionality. The functional coating layer may have a thickness of about 0.5 µm to about 20 µm. Within this range, the functional coating layer may be used in the polarizing plate when stacked on the polarizer.

Although not shown in FIG. 5, the polarizing plate may further include an adhesive layer (not shown) formed on a lower side of the second protective film 550. The polarizing plate can be stacked on the liquid crystal display panel via the adhesive layer. The adhesive layer may be formed of any adhesive for polarizing plates, for example, a (meth)acrylic adhesive.

The polarizing plate may have a thickness of about 25 µm to about 500 µm. Within this range, the polarizing plate can be used in a liquid crystal display. The polarizing plate may have a degree of polarization of about 99% or more and, in one embodiment, about 99.9% to about 99.999%, and a transmittance of about 40% or more and, in one embodiment, about 40% to about 80%. Within this range, the polarizing plate does not suffer from deterioration in optical characteristics when mounted on a liquid crystal display.

In the liquid crystal display, the polarizing plate may be provided as an upper polarizing plate or a lower polarizing plate.

Generally, the liquid crystal display includes a liquid crystal display panel, a backlight unit, and a polarizing plate. As used herein, "upper polarizing plate" indicates a polarizing plate disposed on a front side of the liquid crystal display panel and "lower polarizing plate" indicates a polarizing plate disposed on a rear side of the liquid crystal display panel between the liquid crystal display panel and the backlight unit.

In accordance with another aspect of the present invention, a liquid crystal display including a polarizing plate as set forth above is provided.

In one embodiment, the liquid crystal display includes a liquid crystal display panel; a first polarizing plate formed on an upper surface of the liquid crystal display panel; and a second polarizing plate formed on a lower surface of the liquid crystal display panel.

FIG. 6 is a sectional view of a liquid crystal display in accordance with an embodiment of the present invention.

Referring to FIG. 6, a liquid crystal display 600 according to an embodiment of the present invention may include a liquid crystal display panel 605, a first polarizing plate 610 formed on an upper surface of the liquid crystal display panel 605, and a second polarizing plate 615 formed on a lower surface of the liquid crystal display panel 605.

The first polarizing plate 610 may include a polarizer 620; a first protective film 630 formed on an upper surface of the polarizer 620; a first primer layer 635 formed on an upper surface of the first protective film 630; a second primer layer 640 formed on a lower surface of the first protective film 630; and a second protective film 645 formed on a lower surface of the polarizer 620.

Adhesive layers (not shown) may be formed between the second primer layer 640 and the polarizer 620 and between the polarizer 620 and the second protective film 645, respectively.

The first polarizing plate 610 can be stacked on an upper surface of the liquid crystal display panel 605 via a first adhesive layer 650.

The second polarizing plate 615 may include a polarizer 655; a first protective film 660 formed on a lower surface of the polarizer 655; a first primer layer 665 formed on a lower surface of the first protective film 660; a second primer layer 670 formed on an upper surface of the first protective film 660; and a second protective film 675 formed on an upper surface of the polarizer 655.

Adhesive layers (not shown) may be formed between the second primer layer 670 and the polarizer 655 and between the polarizer 655 and the second protective film 675, respectively.

The second polarizing plate 615 can be stacked on a lower surface of the liquid crystal display panel 605 via a second adhesive layer 680.

Now, further aspects of the present invention will be described in more detail with reference to some examples. However, it should be noted that these examples and comparative examples are provided for illustration only and are not to be construed in any way as limiting the present invention.

EXAMPLES

Example 1

A polyvinyl alcohol film was stretched to an elongation of 3 times at 60° C., followed by adsorption with iodine and stretching to an elongation of 2.5 times in an aqueous solution of boric acid at 40° C., thereby preparing a polarizer. A surface protective film was bonded to an upper surface of the polarizer using an adhesive (Z-200, Nippon Goshei Co., Ltd.), thereby forming a stack structure in which the polarizer, the first protective film, and the primer layer are sequentially stacked. The surface protective film was prepared by coating a primer layer on one surface of a polyethylene terephthalate film (manufactured by Samsung SDI Co., Ltd., Thickness: 20 µm, Re: 105 nm, Rth: 1,580 nm and Nz: 15.5 at a wavelength of 550 nm, Index of refraction: 1.59), which was prepared as the first protective film. Here, the primer layer had an index of refraction of 1.4 (measured at a wavelength of 550 nm using an Axo Scan) and a thickness of 120 nm (measured by a scanning electron microscope (SEM)). A second protective film (N-TAC, KONICA MINORTA, TAC, Thickness: 40 μm) was bonded to a lower surface of the polarizer by a bonding agent (Z-200, Nippon Goshei Co., Ltd.).

Example 2

A polarizing plate was fabricated in the same manner as in Example 1 except that a primer layer had an index of refraction of 1.3.

Example 3

A polyvinyl alcohol film was stretched to an elongation of 3 times at 60° C., followed by adsorption with iodine and stretching to an elongation of 2.5 times in an aqueous solution of boric acid at 40° C., thereby preparing a polarizer. A surface protective film was bonded to an upper surface of the polarizer using an adhesive (Z-200, Nippon Goshei Co., Ltd.). The surface protective film was prepared by coating primer layers on upper and lower surfaces of a polyethylene terephthalate film (manufactured by Samsung SDI Co., Ltd., Thickness: 20 μm, Re: 105 nm, Rth: 1,580 nm and Nz: 15.5 at a wavelength of 550 nm, Index of refraction: 1.59), which was prepared as the first protective film. Here, each of the primer layers had an index of refraction of 1.4 (measured at a wavelength of 550 nm using an Axo Scan) and a thickness of 60 nm (measured by a scanning electron microscope (SEM)). The primer layers were formed of a mixture including a polyester resin, a polyvinyl alcohol resin, an isocyanate-based crosslinking agent, and silica particles. A second protective film (N-TAC, KONICA MINORTA, TAC, Thickness: 40 μm) was bonded to a lower surface of the polarizer by a bonding agent (Z-200, Nippon Goshei Co., Ltd.).

Example 4

A polarizing plate was fabricated in the same manner as in Example 1 except that a primer layer had a thickness of 60 nm.

Example 5

A polarizing plate was fabricated in the same manner as in Example 3 except that primer layers had an index of refraction of 1.3.

Example 6

A polarizing plate was fabricated in the same manner as in Example 1 except that a primer layer had an index of refraction of 1.1 and a thickness of 60 nm.

Example 7

A polarizing plate was fabricated in the same manner as in Example 3 except that primer layers had an index of refraction of 1.1.

Comparative Example 1

A polarizing plate was fabricated in the same manner as in Example 1 except that a primer layer was not formed on a protective film.

Comparative Example 2

A polarizing plate was fabricated in the same manner as in Example 1 except that a primer layer had an index of refraction of 2.0.

Comparative Example 3

A polarizing plate was fabricated in the same manner as in Example 3 except that primer layers had an index of refraction of 2.0.

Comparative Example 4

A polarizing plate was fabricated in the same manner as in Example 3 except that each of upper and lower primer layers had an index of refraction of 2.0 and a thickness of 10 nm.

Comparative Example 5

A polarizing plate was fabricated in the same manner as in Example 1 except that a primer layer had an index of refraction of 0.9.

Comparative Example 6

A polarizing plate was fabricated in the same manner as in Example 3 except that each of upper and lower primer layers had an index of refraction of 0.9 and a thickness of 10 nm.

Measurement of Physical Properties

The polarizing plates were evaluated as to transmittance, variation rate of transmittance and bonding performance by the following methods. Results are shown in Table 1. Here, transmittance was measured at a reference wavelength of 550 nm in the wavelength range of 380 nm to 780 nm.

(1) Transmittance (%) and variation rate of transmittance (%): Transmittance of the surface protective film was measured using a UV-2450 (Shimadzu Co., Ltd.) transmittance tester. Transmittance of the polarizing plate was measured using a spectrophotometer V-7100 (Jasco Co., Ltd.), and a variation rate of transmittance of the polarizing plate was calculated by Equation 5:

$$\text{Variation rate of transmittance (\%)} = (T_B - T_A)/T_A \times 100. \quad \text{Equation 5}$$

(where $T_A$ is an initial transmittance of the polarizing plate, and $T_B$ is a transmittance of the polarizing plate after being maintained at 85° C. for 500 hours).

(2) Bonding performance: Bonding performance was determined by measuring bonding force using a texture analyzer (TA) after bonding the protective film to the polarizer via a bonding agent (water-based or UV curable bonding agent), followed by curing (Bonding performance: ⊚: good, Δ: middle, X: poor).

TABLE 1

| | Constitution of protective film | | | | | | | Transmittance (%) | | | |
|---|---|---|---|---|---|---|---|---|---|---|---|
| | | | Index of refraction of primer layer | | Thickness of primer layer (nm) | | | | | | |
| | One-sided coating | Both-sided coating | Upper primer layer | Lower primer layer | Upper primer layer | Lower primer layer | $R_1/R_2$ | Surface protective film | Polarizing plate ($T_A$) | Rate of variation (%) | Bonding performance |
| Example 1 | ○ | — | 1.4 | — | 120 | — | 0.881 | 93.19 | 42.43 | 1.4 | ◎ |
| Example 2 | ○ | — | 1.3 | — | 120 | — | 0.818 | 94.12 | 42.58 | 1.4 | ◎ |
| Example 3 | — | ○ | 1.4 | 1.4 | 60 | 60 | 0.881 | 93.56 | 42.49 | 1.3 | ◎ |
| Example 4 | ○ | — | 1.4 | — | 60 | — | 0.881 | 92.82 | 42.40 | 1.6 | ◎ |
| Example 5 | — | ○ | 1.3 | 1.3 | 60 | 60 | 0.818 | 94.32 | 42.66 | 1.3 | ◎ |
| Example 6 | ○ | — | 1.1 | — | 60 | — | 0.692 | 93.89 | 42.53 | 1.6 | ◎ |
| Example 7 | — | ○ | 1.1 | 1.1 | 60 | 60 | 0.692 | 92.41 | 42.38 | 1.3 | ◎ |
| Comparative Example 1 | — | — | — | — | — | — | — | 89.02 | 40.31 | 3.2 | X |
| Comparative Example 2 | ○ | — | 2.0 | — | 120 | — | 1.258 | 83.62 | 38.42 | 3.5 | ◎ |
| Comparative Example 3 | — | ○ | 2.0 | 2.0 | 60 | 60 | 1.258 | 76.13 | 30.47 | 4.0 | ◎ |
| Comparative Example 4 | — | ○ | 2.0 | 2.0 | 10 | 10 | 1.258 | 77.06 | 31.25 | 3.9 | Δ |
| Comparative Example 5 | ○ | — | 0.9 | — | 120 | — | 0.567 | 89.84 | 40.54 | 3.2 | ◎ |
| Comparative Example 6 | — | ○ | 0.9 | 0.9 | 10 | 10 | 0.567 | 83.82 | 38.84 | 3.5 | Δ |

($R_1$ is an index of refraction of the primer layer, and $R_2$ is an index of refraction of the first protective film)

Measurement Result

As shown in Table 1, the polarizing plates prepared in Examples 1 to 7 could reduce transmission variation under reliability test conditions (85° C. for 500 hours).

By contrast, in Comparative Example 1 wherein the primer layer was not formed on the protective film, the protective film did not include a primer having double-bonding performance. As a result, the protective film exhibited low bonding performance with respect to the polarizer and had low transmittance and a high variation rate of transmittance under reliability test conditions when applied to a polarizing plate, thereby providing low durability.

Furthermore, in Comparative Examples 2 to 6 wherein the refractive index ratio of the primer layer to the first protective film was not according to one or more aspects of the present invention, the first protective film and the polarizing plate suffered from deterioration in transmittance, and the variation rate of transmittance under reliability test conditions was high, thereby causing deterioration in durability.

While some example embodiments have been described herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and equivalents thereof.

What is claimed is:

1. A polarizing plate comprising:
a polarizer; and
a surface protective film on a first surface of the polarizer, wherein the surface protective film comprises a first protective film on the first surface of the polarizer, and a primer layer on at least one surface of the first protective film,
a refractive index ratio of the first protective film to the primer layer satisfying Equation 1:

$$0.6 < R_1/R_2 < 1.0,$$

where $R_1$ is an index of refraction of the primer layer and $R_2$ is an index of refraction of the first protective film, the first protective film having an in-plane retardation of about 500 nm or less and an out-of-plane retardation of about 10,000 nm or less at a wavelength of 550 nm, as respectively represented by Equation 2:

$$Re = (nx - ny) \times d,$$

and Equation 3:

$$Rth = ((nx + ny)/2 - nz) \times d,$$

where Re is the in-plane retardation, Rth is the out-of-plane retardation, nx, ny, and nz are indices of refraction at a wavelength of 550 nm in the x-, y- and z-axis directions, respectively, of the first protective film, and d is a thickness of the first protective film.

2. The polarizing plate according to claim 1, wherein the primer layer has a thickness of about 5 nm to about 200 nm.

3. The polarizing plate according to claim 1, wherein the primer layer has an index of refraction of about 1.0 to about 1.6.

4. The polarizing plate according to claim 1, wherein the primer layer comprises silica particles.

5. The polarizing plate according to claim 4, wherein the silica particles have an average particle diameter of about 0.001 μm to about 10 μm.

6. The polarizing plate according to claim 4, wherein the silica particles are present in an amount of about 0.1 wt % to about 20 wt % in the primer layer.

7. The polarizing, plate according to claim 1, wherein the first protective film has a ratio of machine direction elongation to transverse direction elongation of about 1:0.8 to about 1:1.2.

8. The polarizing plate according to claim 1, wherein the first protective film has a ratio of machine direction elongation to transverse direction elongation of about 1:1 and a degree of biaxiality of about 1.0 or more at a wavelength of 550 nm, as represented by Equation 4:

$$NZ=(nx-nz)/(nx-ny),$$

where NZ is the degree of biaxiality, and nx, ny, and nz are indices of refraction at a wavelength of 550 nm in the x-, y- and z-axis directions, respectively, of the first protective film.

9. The polarizing plate according to claim 1, wherein the first protective film has nx-ny of about 0 to about 0.1, and a degree of biaxiality of about 5.0 or more, as represented by Equation 4:

$$NZ=(nx-nz)/(nx-ny),$$

where NZ is the degree of biaxiality, and nx, ny, and nz are the indices of refraction at a wavelength of 550 nm in the x-, y- and z-axis directions, respectively, of the first protective film.

10. The polarizing plate according to claim 1, wherein the polarizing plate has a variation rate of transmittance of about 0.1% to about 1.8%, as represented by Equation 5:

Variation rate of transmittance (%)=$(T_B-T_A)/T_A \times 100$, where $T_A$ is an initial transmittance of the polarizing plate, and $T_B$ is a transmittance of the polarizing plate after being maintained at 85° C. for 500 hour.

11. The polarizing plate according to claim 1, wherein the surface protective film has a transmittance of about 92% or greater.

12. The polarizing plate according to claim 1, wherein the first protective film is a non-birefringent film.

13. The polarizing plate according to claim 1, wherein the first protective film comprises at least one resin selected from the group consisting of polyester resins, (meth)acrylic resins, and cyclic polyolefin resins.

14. The polarizing plate according to claim 1, further comprising a second protective film on a second surface of the polarizer opposite the first surface.

15. The polarizing plate according to claim 14, wherein the second protective film comprises at least one resin selected from the group consisting of cellulose resins, polyester resins, cyclic polyolefin resins, polycarbonate resins, polyethersulfone resins, polysulfone resins, polyimide resins, polyimide resins, polyolefin resins, polyarylate resins, polyvinyl alcohol resins, polyvinyl chloride resins, and polyvinylidene chloride resins.

16. A liquid crystal display comprising the polarizing plate according to claim 1.

* * * * *